United States Patent [19]

Bornstein

[11] 4,069,276

[45] Jan. 17, 1978

[54] LOW-PRESSURE, NO-COOL PHENOLIC TYPE RESIN FOR DECORATIVE LAMINATES

[75] Inventor: Leopold F. Bornstein, Atlanta, Ga.

[73] Assignee: Georgia-Pacific Corporation, Portland, Oreg.

[21] Appl. No.: 689,046

[22] Filed: May 24, 1976

[51] Int. Cl.² .................. C08L 61/26; C08G 12/12
[52] U.S. Cl. .................. 260/839; 260/67.6 R; 156/335; 428/535
[58] Field of Search ............ 260/839, 67.6 R

[56] References Cited

U.S. PATENT DOCUMENTS

| | | | |
|---|---|---|---|
| 2,197,357 | 4/1940 | Widner et al. | 260/72 |
| 2,294,590 | 9/1942 | West | 260/839 |
| 2,502,051 | 7/1951 | Lindenfelser et al. | 260/67.6 |
| 2,507,199 | 5/1950 | Eber | 260/839 |
| 3,194,723 | 7/1965 | Grudus et al. | 260/67.6 |
| 3,488,310 | 1/1970 | McCombs | 260/839 |
| 3,501,429 | 3/1970 | Bonzagni | 260/17.3 |
| 3,560,412 | 2/1971 | Bernardo | 260/21 |
| 3,624,035 | 11/1971 | von Portatius | 260/839 |

*Primary Examiner*—John C. Bleutge
*Attorney, Agent, or Firm*—Schuyler, Birch, Swindler, McKie & Beckett

[57] ABSTRACT

Phenolic resins employed in the manufacture of high-pressure decorative laminates are modified by the addition of a partially etherified melamine-formaldehyde resin which is the reaction product of melamine, formaldehyde, an aliphatic polyol and furfural. The modified phenolic resin exhibits better penetration and flow properties and cures more rapidly. Laminates made with this modified resin can be manufactured at lower pressures and without the lengthy in-press cooling step of the prior art. Moreover, the laminates so produced possess enhanced flexibility due to the internal plasticizing effect of the modifier of the present invention.

5 Claims, No Drawings

LOW-PRESSURE, NO-COOL PHENOLIC TYPE RESIN FOR DECORATIVE LAMINATES

BACKGROUND OF THE INVENTION

1. Field of the Invention

This invention relates to a modified phenolic resin suitable for the manufacture of decorative laminates.

2. Description of the Prior Art

A "laminate," as that term is employed herein, generally refers to a unitary structure built up from a plurality of thermo-setting resin-impregnated substrate layers. Laminates are further classified according to their end use, for example, into electrical laminates, decorative laminates, and the like. Decorative laminates are widely employed to provide a water, chemical and cigarette burn resistant finish for furniture and counter tops.

In the conventional manufacture of decorative laminates, a plurality of paper substrate layers are saturated with a phenolic resin and dried to advance the resin. The dried and saturated sheets are then stacked up and pressed between heated platens until the resin is fully cured and the laminate is fully consolidated. For a decorative effect, several sheets of alpha cellulose white paper saturated with an expensive amino resin are placed on top of the assembled phenolic laminates and then pressed simultaneously in the hot press. The laminate is then cooled under pressure and removed from the press.

Typical prior art manufacturing processes employing phenolics require a laminating pressure of about 1000 to 1500 psi to achieve the proper resin flow and penetration necessary to produce dense, blister-free laminates. The danger of blistering also necessitates leaving the cured laminate in the press until it has fully cooled. This cooling step can take from about one-half hour up to several hours, depending on the thickness of the laminate and the heating conditions. A new load of resin-treated paper sheets is then placed in the press and the press is reheated back up to curing temperatures. This reheating step can take longer than the cooling step described above. This conventional manufacturing process is a lengthy and expensive one. While certain expensive amino resins possess low-pressure, no-cool capabilities, see e.g., Yasutake U.S. Pat. No. 3,523,051, phenolics, the work horse of the laminating industry, have heretofore required both high pressure and a cooling period.

The finished phenolic laminate produced in the standard manner, although very strong, and chemical and wear resistant, is extremely brittle and cracks on any effort to bend it. For many applications, it is highly desirable to use more flexible laminates which can be bent to follow the contours of the construction. To meet these needs, a special laminate, called post-formable grade, has been developed. This post-formability is achieved by the use of a special plasticized resin. The plasticizers used are generally drying oils or polymerizable oils, plasticizers and natural resins. While this use of plasticizers does improve the flexibility of the laminate, the plasticized laminates of the prior art generally exhibit lower strength and lower resistance to water or chemicals. This type of laminate also requires the application of high pressures and a cooling period.

The disadvantages of producing decorative laminates with prior art resins and by the prior art methods are substantial and costly. The use of high pressures results in high equipment procurement and maintenance costs and increased energy requirements. The lengthy cooling and reheating steps further contribute to the inefficiency of this process. Moreover, the compromises in overall quality necessary to impart flexibility to the socalled post-formable grade laminates by conventional plasticizing techniques renders these laminates unsuitable for many applications.

SUMMARY OF THE INVENTION

It is, therefore, an object of the present invention to provide a resin modifying agent which will alleviate the problems of the prior art when added to standard phenolic laminating resins.

It is also an object of this invention to provide a modified phenolic laminating resin which can be cured to a blister-free laminate at relatively low pressures.

It is a further object of this invention to provide a modified laminating resin which does not have to be cooled in the laminating press to prevent blistering.

Another object of the present invention is to provide a modified laminating resin having improved flow and penetration due to internal plasticization.

It is another object of the present invention to provide a phenolic laminate having increased flexibility without any substantial decrease in strength and chemical resistance.

In accordance with this invention there is provided a resin modifying composition for use with a phenolic laminating resin, the composition comprising a partially etherified melamine-formaldehyde resin which is the reaction product of melamine, formaldehyde, an aliphatic polyol and furfural.

In another aspect of this invention there is provided a laminating resin composition comprising a phenolic resin modified with the abovedescribed partially etherified melamine-formaldehyde resin.

The present invention also relates to a process for producing a blister-free phenolic laminate comprising the steps of impregnating a plurality of substrate sheets with a modified phenolic resin, consolidating a plurality of the impregnated sheets in a press at a pressure of from about 150 to about 500 psi and at a temperature sufficient to cure the resin, and removing the blister-free laminate from the press after the consolidation step; the modified phenolic resin comprising a phenolic resin having added thereto the above described partially etherified melamine-formaldehyde resin.

In accordance with the present invention there is also provided a laminate comprising a cured, consolidated assembly of a plurality of sheets impregnated with a modified phenolic resin, the modified phenolic resin comprising a phenolic resin having added thereto the above described partially etherified melamine-formaldehyde resin.

DETAILED DESCRIPTION OF THE INVENTION

The modifying agent of the present invention is a partially etherified melamine-aldehyde condensation product which is the reaction product of melamine, an aldehyde, an aliphatic polyol and furfural. The polyol component should contain at least three hydroxyl groups, and can be any of the well-known aliphatic polyhydroxy compounds. Suitable polyols include, inter alia, polyglycols such as ethylene and propylene polyglycol, and polyglycerines, or mixtures thereof. The preferred aldehyde is formaldehyde, although other aldehydes may be employed.

In its preferred form the resin modifier of the present invention comprises the reaction product of from about 10 to 25% melamine, from about 5 to 12% formaldehyde (on a dry basis), from about 20 to 40% polyol, and from about 10 to 30% furfural. In practice, the ratio of melamine to formaldehyde generally approximates 2:1.

The most preferred resin modifier composition is as follows:

melamine — 25%
formaldehyde (dry basis) — 12%
furfural — 28%
polyglycerine — 35%

The components of resin modifier of the present invention can be combined by simple mixing in any order. To facilitate the mixing of these components, it is preferred to first dissolve paraformaldehyde in the polyol and then add the remaining ingredients. The reaction of the components to form the partially etherified melamine-formaldehyde resin of the present invention will take place upon subjecting this mixture to mild heat for a relatively short time. In practice, the reaction proceeds quickly (i.e., 15 to 30 minutes) at temperatures of about 75° to 120° C. The reaction is time-temperature dependent, and as will be apparent to those skilled in the art, longer or shorter times may be employed with correspondingly lower or higher temperatures.

The present invention also relates to a thermosetting phenolic laminating resin containing the above-described etherified melamine modifier. The phenolic resins to which this invention pertain include resins based on phenol, substituted phenol and phenol homologs, used as such or in combination with other materials such as thermoplastic resins, oils or other resin-forming materials.

The preferred phenolic resin is an alkaline catalyzed phenolformaldehyde called a resol or A-stage resin. This resin is soluble in alcohol. Expecially preferred is a phenol-formaldehyde resin condensed in the presence of ammonia.

The modifying resin can be added to the finished phenolic laminating resin at any time prior to the step of impregnating the substrates. It is preferred, however, to add the modifier at the end of the phenolic resin manufacturing process while the phenolic resin is still hot. This promotes partial co-polymerization between the phenolic and modifier. The resin-modifier mixture has a shelf life comparable to unmodified phenolic laminating resins.

The modifying agent should be added to the phenolic laminating resin in an amount sufficient to promote penetration, flow and curing speed of the resin such that low-pressure, no-cool performance is obtained. For most applications, addition of from about 5 to 10% of the modifier, based on resin solids, is suitable to achieve these results.

The modified phenolic resin of the present invention possesses superior flow and penetration properties which make it expecially suitable for the production of decorative laminates. This resin also exhibits more rapid curing characteristics which substantially eliminate the need for the inpress cooling period after pressing. Moreover, the partially etherified melamine modifier exhibits an internal plasticizing effect on the resin which results in a laminate with better post-formability.

Palazzolo, U.S. Pat. No. 3,707,296 discloses a laminated ski surface formed with a phenolic resin modified with from 10 to 70 weight percent of a melamine-formaldehyde resin. The resin modifying agent of Palazzolo is not etherified with a polyol, and is not suitable for low pressure applications.

The present invention also contemplates a process for producing decorative laminates employing the specially modified laminating resin described above. In the first step of the improved laminating process of this invention, a plurality of substrate layers are impregnated with a standard phenol resin which has been modified by the addition of the partially etherified melamine product previously described. The substrate can be any of those normally employed in the manufacture of decorative laminates, such as paper, textiles, asbestos and the like. The impregnated sheets then are dried to advance the resin. Generally, the resin content of the dried impregnated sheets should range from about 25 to about 35% by weight. The dried sheets next are stacked to provide an assembly of the desired thickness and placed in a laminating press. The stacked assembly is consolidated into a unitary mass by the application of heat and pressure. When employing the specially modified phenolic resin of the present invention, it is possible to achieve blister-free consolidation at low pressures, i.e., from about 150 to 500 psi. Press temperatures in the range of about 250 to 350° F are suitable to achieve the desired degree of resin cure. The press time, of course, depends on the thickness of the laminate but generally falls in the range of from about 15 minutes to an hour.

At the end of the heating cycle, the blister-free laminates of the present invention may be removed from the press without any in-press cooling step to tie up the press time. Since the press can be still at full temperature, the next assembly of sheets can be immediately pressed without any heat-up delay. The savings in time and energy are apparent.

The blister-free laminate of the present invention is not only more economical to manufacture, but possesses enhanced characteristics. Due to the internal plasticizing effect of the modifier of the present invention this laminate is more flexible than prior art straight phenolic grades, and can be used in place of many post-formable grades. Moreover, there is no substantial loss of strength or chemical resistance in the flexible laminates of the present invention. For applications requiring extreme flexibility, a reduced amount of a conventional external plasticizer such as a sulfanilamide or gum rosin can be added.

Reference herein has been made primarily to "decorative" laminates only to exemplify one form of the present invention. This invention also is applicable to other laminates which employ phenolic resins, e.g., electrical.

The following Examples are included for illustrative purposes only and are not intended to limit the scope of the invention.

EXAMPLE 1

A resin modifier according to the present invention was formulated as follows:

|  | Parts by Weight |
| --- | --- |
| melamine | 25.38 |
| paraformaldehyde | 11.42 |
| polyglycerine | 35.20 |
| methanol (solvent) | 28.0 |

The polyglycerine and paraformaldehyde were added to a resin kettle and this mixture was heated to 100° C and held there until dissolved (about 15 minutes). The dissolution of paraformaldehyde can be facilitated by adjusting the pH to between 8 to 9 with caustic. Next the melamine component was added and held at 100° C for another 15 minutes. The resin modifier was then cooled to 70° C and diluted with the methanol. The resulting solution was then cooled to room temperature and put aside for later use. The above formulated modifier does not contain furfural, so it is necessary to add the furfural component at the time the modifier and phenolic resin are combined.

EXAMPLE 2

A resin modifier containing furfural was formulated as in Example 1 except that the methanol was replaced by furfural. The procedure was the same as in Example 1 except that furfural was added to the partially etherified melamine-formaldehyde resin while the resin was still at 100° C rather than after cooling as in the case of methanol.

EXAMPLE 3

A modified phenolic laminating resin according to the present invention was formulated as follows:

phenol — 39.41
formaldehyde — 30.60
ammonia — 2.62
hexamethylenetetramine — .88
modifier of Example 1 — 7.00
methanol — 17.50
furfural — 2.00

This resin was made by loading the phenol, formaldehyde and ammonia in a resin kettle and reacting the mixture at 75 to 80° C to a free formaldehyde content of 2% maximum. Then, the hexamethylenetetramine was added and the mixture was distilled down to a water content of 6 to 10%. The modifier and furfural were then added and the finished resin was cooled to room temperature. The furfural component added in the last step would not be necessary if the resin modifier of Example 2 was employed.

EXAMPLE 4

A strong flexible laminate with good chemical resistance was produced as follows. A plurality of paper substrate sheets were impregnated with the laminating resin of Example 3. The sheets were then dried to advance the resin. Next the dried sheets were stacked into an assembly approximately 0.1 inches thick and placed in a conventional laminating press. The assembly was pressed at a pressure of 250 psi and a temperature of 300° F for about 20 minutes. The fully consolidated blister-free laminate was immediately removed from the press without any cooling step.

While certain specific embodiments of the invention have been described with particularity herein, it should be recognized that various modifications thereof will occur to those skilled in the art. Therefore, the scope of the invention is to be limited solely by the scope of the claims appended hereto.

I claim:
1. A laminating resin composition comprising a thermosetting phenolic resin modified with about 5 to about 10 percent by weight of the resin solids of a partially etherified melamine-formaldehyde resin, said partially etherified melamine-formaldehyde resin comprising the reaction product of from about 10 to 25 percent by weight of melamine, from about 5 to 12 percent by weight of formaldehyde on a dry basis, from about 20 to 40 percent of an aliphatic polyol and from about 10 to 30 percent by weight of furfural.
2. The laminating resin composition of claim 1 wherein said polyol is polyglycerine.
3. The laminating resin composition of claim 1 wherein said partially etherified melamine-formaldehyde resin comprises the reaction product of about 25% by weight of melamine, about 12% by weight of formaldehyde on a dry basis, about 35% by weight of polyglycerine, and about 28% by weight of furfural.
4. The laminating resin composition of claim 1 wherein said phenolic resin comprises an alkaline catalyzed phenol-formaldehyde.
5. The laminating resin composition of claim 4 wherein said phenol-formaldehyde is catalyzed by ammonia.

* * * * *